United States Patent [19]
Kerr

[11] Patent Number: 6,035,886
[45] Date of Patent: Mar. 14, 2000

[54] PREFABRICATED SINK ROUGH-IN PLUMBING APPARATUS

[76] Inventor: Frank Kerr, 4200 Green Hwy., Tecumseh, Mich. 49286

[21] Appl. No.: 09/165,223

[22] Filed: Oct. 1, 1998

[51] Int. Cl.[7] ....................................................... F16L 5/00
[52] U.S. Cl. .......................... 137/360; 137/375; 137/377; 4/695
[58] Field of Search ..................................... 137/360, 375, 137/377; 4/695

[56] References Cited

U.S. PATENT DOCUMENTS

| | | |
|---|---|---|
| 2,295,888 | 9/1942 | Bucknell et al. . |
| 2,930,505 | 3/1960 | Meyer . |
| 3,611,451 | 10/1971 | Armstrong . |
| 4,654,900 | 4/1987 | McGhee . |
| 4,942,896 | 7/1990 | Slusser . |
| 5,261,444 | 11/1993 | Childers . |
| 5,265,284 | 11/1993 | Dottori et al. . |
| 5,359,820 | 11/1994 | McKay . |
| 5,404,599 | 4/1995 | Warkus et al. . |

*Primary Examiner*—A. Michael Chambers
*Assistant Examiner*—Thomas L. McShane
*Attorney, Agent, or Firm*—Young & Basile, PC

[57] ABSTRACT

A foam housing surrounds first and second water conduits and a drain conduit with the ends of the conduits projecting outwardly from opposite end walls of the housing. A tee-fitting is interposed in each of the conduits and is connected to a connector pipe projecting exteriorly of a front wall of a housing for connection to a sink hot and cold water lines and a sink drain line. Upper ends of the first and second conduits are closed to form air cushions. The upper end of the drain pipe is removably closed by a cap. The lower ends of the conduits project exteriorly of the lower end wall of the housing and are insertable through holes drilled in the base stud of a frame wall for connection to a building water supply pipes and drain pipe and in supporting the housing in a frame stud wall.

9 Claims, 2 Drawing Sheets

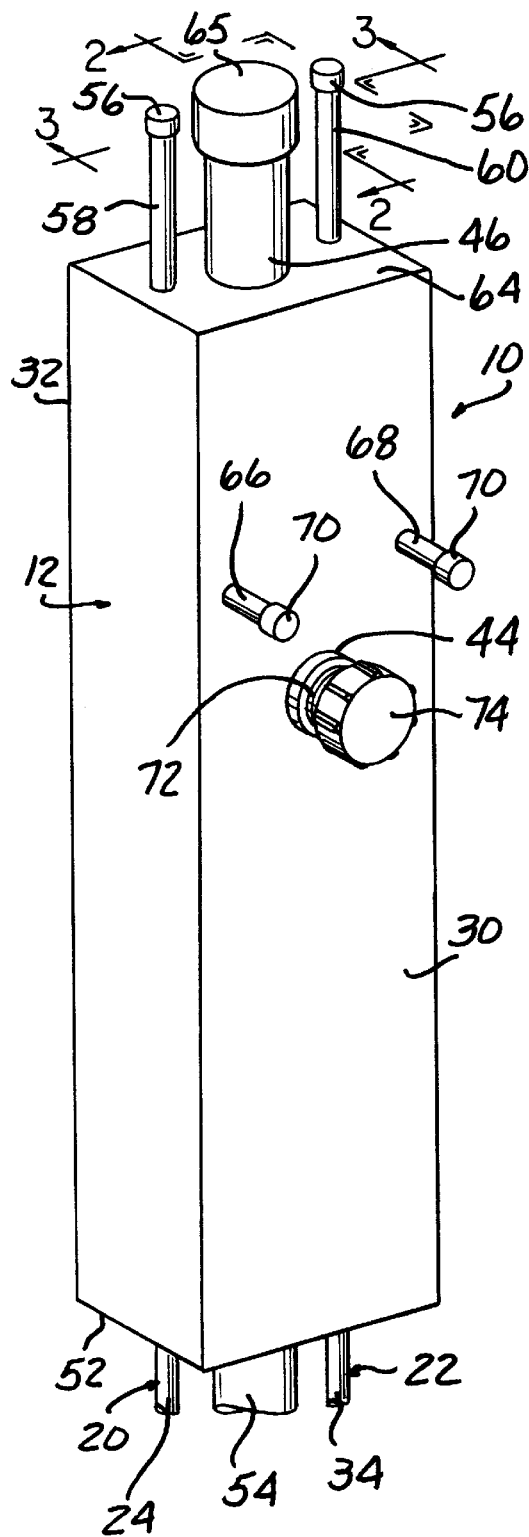
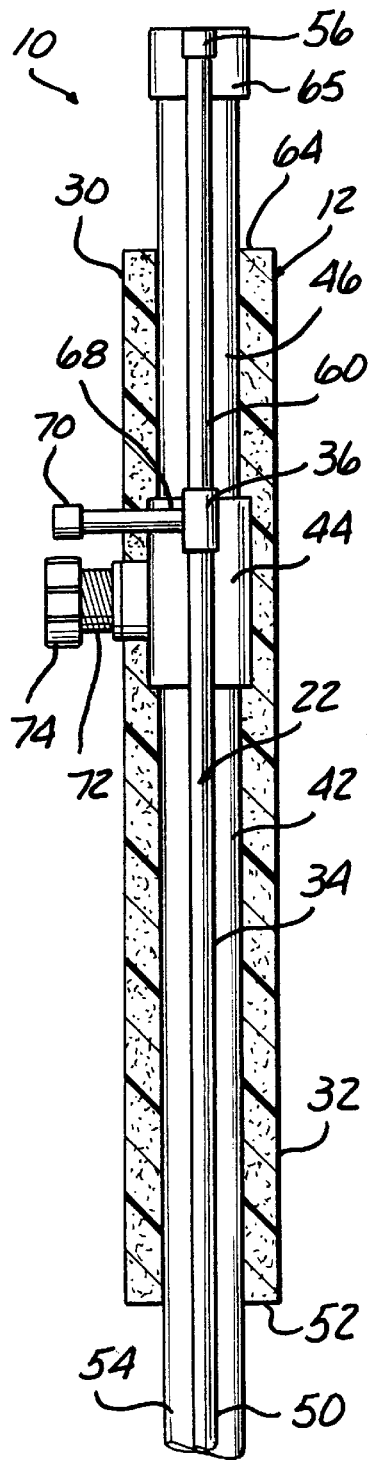
FIG-1
FIG-2

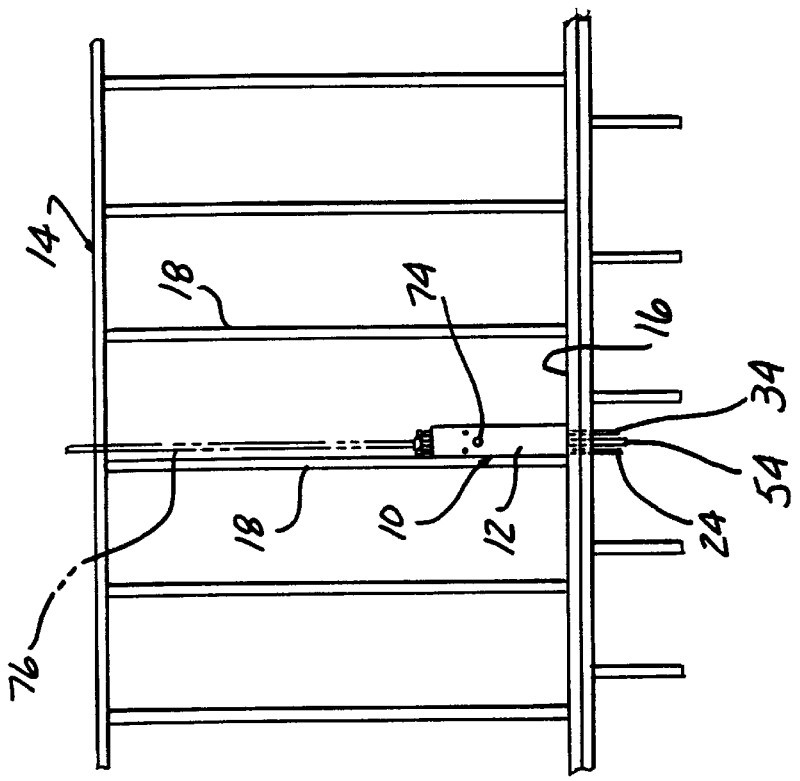
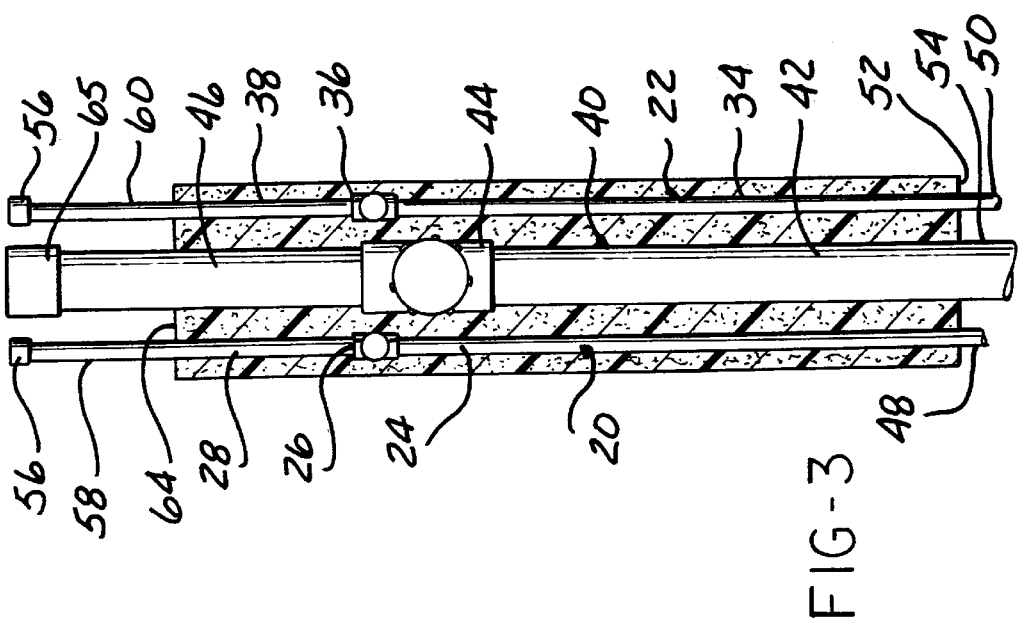

PREFABRICATED SINK ROUGH-IN PLUMBING APPARATUS

BACKGROUND OF THE INVENTION

1. Field of the Invention

The present invention relates, in general, to plumbing and, specifically, to sink plumbing connections.

2. Description of the Art

Plumbing connections to sinks in buildings, homes, etc., have essentially been standardized. Hot and cold pipes connected at one end to tees or elbows in the main hot and cold water pipes of a building are connected to vertical pipes which extend through holes in the base of the frame stud wall to the sink fitting connection height. Elbows or tees are mounted on the ends of the vertical pipes and another short pipe or stub is connected to each fitting and extends outward beyond the outer surface of a wall panel or surface to be mounted on the vertical wall studs, such as a sheet of drywall, etc. A short vertical extension pipe extends from each tee fitting and is capped off to form an air cushion to prevent water hammering within the pipes. A drain pipe, typically formed of a large diameter PVC pipe, is connected at one end to the building drain pipe by an elbow or tee and extends through to a hole in the wall base stud to another fitting to which a horizontal pipe extension is mounted for connection to the sink drain pipe.

While the sink plumbing connections are fairly standard, hookup is time consuming due to the large number of separate connections. Further, all such sink connections must be completed before the drywall or plaster can be installed over the wall studs.

A number of prefab housings and modules have been devised to simplify plumbing connections to washers and dryers, showers, etc. However, such prefabricated fixtures have not been of an optimum design from low cost, and easy, quick installation viewpoints.

Thus, it would be desirable to provide a prefabricated sink fixture apparatus which has a low manufacturing cost, easy and quick installation while providing all the connections necessary to mount a sink in a bathroom of a building, home, etc.

SUMMARY OF THE INVENTION

The present invention is a prefabricated sink rough-in plumbing apparatus which simplifies the installation and connection of sink hot and cold and drain pipes while enabling the connections to be quickly installed at a sink location to enable the mounting of a wall panel or other wall surface to the frame wall.

In a preferred embodiment, the prefabricated rough-in sink plumbing apparatus of the present invention comprises a housing having a front wall and opposed first and second end walls. First and second water conduits or pipes, each with first and second ends, are mounted in the housing with the first and second ends projecting outwardly of each of the first and second conduits from the first and second end walls of the housing, respectively. A drain conduit or pipe, also with first and second ends, is mounted in the housing with the first and second ends extending through the first and second end walls of the housing, respectively.

First, second and third fittings are disposed between the first and second ends of each of the first and second conduits and the drain conduit and connected in fluid flow communication with the first and second conduits and the drain conduit. First and second connector pipes are connected to the first and second fittings and extend exteriorly of the front wall of the housing for connection to a sink hot and cold water lines. A third connector pipe is connected to the third fitting and extends exteriorly of the front wall of the housing for connection to the sink drain line.

Preferably, the housing is formed of an insulating material, such as a foam material and, more preferably, styrofoam. The housing is self supporting within a frame stud wall on the base stud.

Means are provided for forming the second ends of the first and second conduits as air cushions. Preferably, the air cushion forming means comprises a cap sealingly mounted on the second ends of each of the first and second conduits.

Removable caps are mounted on the first and second connector pipes and the drain extender pipe projecting through the front wall of the housing to prevent debris from entering the first and second conduits and drain conduit within the housing.

A removable means is also mounted on the second end of the drain conduit for closing the second end of the drain conduit. Preferably, the closing means is a removable cap. The cap may be removed to enable the drain conduit to be connected to the building vent conduit.

The prefabricated sink rough-in plumbing apparatus of the present invention simplifies the rough-in installation and connection of sink plumbing pipes and fittings by providing conduits and fittings in a prefabricated housing or module which can be easily inserted into a frame stud wall and then the drywall or other wall surface immediately mounted over the frame wall. The connector pipes extending from fittings in the conduits mounted in the housing project a sufficient distance outward from a front wall of the housing so as to be disposed exteriorly of any later applied wall surface. These connector pipes provide suitable connections to a sink hot and cold water lines and the sink drain line. The first and second water carrying conduits within the housing are unitarily formed with air cushions at upper ends to prevent "water hammer." The drain connection may also be connected at an upper end to a building vent line as typically required by local building codes.

BRIEF DESCRIPTION OF THE DRAWING

The various features, advantages and other uses of the present invention will become more apparent by referring to the following detailed description and drawing in which:

FIG. 1 is a perspective view of a sink rough-in plumbing apparatus according to the present invention;

FIG. 2 is a cross-sectional view generally taken along line 2—2 in FIG. 1;

FIG. 3 is a cross-sectional view generally taken along line 3—3 in FIG. 1; and FIG. 4 is a front elevational view showing the mounting of the sink plumbing apparatus of the present invention in a vertical frame stud wall.

DESCRIPTION OF THE PREFERRED EMBODIMENT

Referring now to the drawing, and to FIG. 1, in particular, there is depicted a prefabricated sink rough-in plumbing apparatus 10 which simplifies the rough-in plumbing connections to a sink.

The apparatus 10 includes a housing 12 having dimensions suitable for fitting completely within a stud frame wall in a building. Thus, the housing may have depth dimensions suitable for mounting over a 2×4, 2×6, etc., frame construction. Preferably, the housing 12 sits on a base stud 16 in between a pair of vertical studs 18, at any position between the pair of vertical studs 18 depending upon the desired mounting position of the sink, as shown in FIG. 4.

The housing 12 is preferably formed of a thermal insulating material. Preferably, the housing 12 is formed of a foam insulating material, such as styrofoam, for example only.

First and second water carrying lines or conduits 20 and 22, respectively, are mounted in and enclosed by the housing 12, such as being foamed in place in a suitable mold in which the foam material used to form the housing is injected in a liquid state and then allowed to expand and cure to a solid state.

Each of the first and second conduits 20 and 22, while hereafter referred to as each being a single conduit, will be understood to include two separate conduit sections rigidly and sealingly coupled together by a fitting. Thus, the first conduit 20 includes a first pipe 24, a first fitting, such as a tee-fitting 26, and a second pipe 28 which are rigidly interconnected into a unitary plumbing connection by solder, mechanical compression fittings, etc. The first conduit 20 is centrally spaced between the front and back surfaces 30 and 32 of the housing 12 and is generally in line with the second conduit 22.

Likewise, the second conduit 22 includes a first pipe 34, a tee-fitting or connection 36 and a second pipe 38, all unitarily joined together.

Typically, the first and second conduits 20 and 22 are formed of half inch copper pipe. Further, the first and second conduits 20 and 22 are spaced apart as shown in FIGS. 1 and 3 on opposite sides of a drain conduit 40. The drain conduit 40 which is typically 1½ inch PVC pipe, also includes a first drain pipe 42, a tee-connection 44 and a second drain pipe 46. The first and second drain pipes 42 and 46 are joined to the tee-fitting 44 by epoxy bonding, etc.

As shown in FIGS. 1–4, the lower ends 48 and 50 of the first pipes 24 and 34 of the first and second conduits 20 and 22 project outwardly below the bottom end wall 52 of the housing 12. Likewise, a lower end 54 of the first drain pipe 42 projects outwardly from the bottom or end wall 52 of the housing 12. The lower ends 48 and 50 of the first pipes 48 and 50 and the lower end 54 of the drain pipe 42 project through bores drilled in the base stud 16 of the stud frame wall 14 such that the lower ends 48 and 50 of the first and second conduits 20 and 22 and the lower end 54 of the drain conduit 40 project through the base stud 16 into the underlying space of a lower floor, basement, etc., in which a continuation of the building hot and cold pipes and the drain pipe are disposed. The lower ends 48 and 50 of the first and second conduits 20 and 22 as well as the lower end 54 of the drain conduit 40 are connected to the building hot and cold water pipes and into the building drain pipe by conventional connections or fittings.

Means are provided for closing the upper ends of the first and second conduits 20 and 22 to form an air cushion within the upper ends of the first and second conduits 20 and 22 to prevent water hammer the enclosing means preferably comprises a cap 56 soldered or otherwise fixedly attached to the upper ends of the second pipes 28 and 38 of the first and second conduits 20 and 22.

The caps 56 are mounted on the upper ends 58 and 60 of the second pipes 28 and 38 project upwardly above the upper end wall 64 of the housing 12. Likewise, the upper end of the second drain pipe 46 is closed by a closing means, such as a cap 65. The cap 65 is removable to enable the second drain pipe 46 to be connected to a building vent pipe 76 shown in phantom in FIG. 4.

As shown in FIGS. 2 and 3, the first and second connections 26 and 36 preferably comprise tee-fittings which are soldered or otherwise fixedly and sealingly joined to the ends of the first and second pipes 24, 28 and 34, 38 of the first and second conduits 20 and 22. A connector pipe 66 and 68 is mounted in the central opening of each tee-fitting 26 and 36, respectively, and project outwardly through the front wall 30 of the housing and extend a predetermined distance, such as two inches by way of example only, from the front surface 30 of the housing 12. The outer ends of the connector pipes 66 and 68 are closed by means of a temporary cap 70 to prevent dirt and debris from entering the pipes 66 and 68 prior to their connection to the sink hot and cold water lines. The distance that each of the connector pipes 66 and 68 extends outward from the front surface 30 of the housing 12 is selected to enable the outer ends of each of the pipes 66 and 68, which are temporarily closed by the cap 70, to project outwardly through a sheet of drywall, or an applied plaster wall, which is mounted over the vertical studs 18 of the stud frame wall 14.

Similarly, the drain fitting 44 also is a tee-type fitting in which a central connector pipe 72 is mounted and closed by a temporary cap 74. The cap 74 prevents dirt from entering the drain conduit 40 and can be removed to enable the drain conduit 40 to be connected to the sink drain line.

In a prefabricated construction, the apparatus 10, as shown in FIG. 1, has the caps 56 and 64 attached to the upper ends of the first and second conduits 20 and 22 and the second drain pipe 63. The caps 70 are also mounted over the connector pipes 66 and 68 and the cap 74 is mounted over the drain connector 72. The apparatus 10 is now ready for installation into a stud wall 14.

First, three holes are drilled through the base stud 16 of the frame wall 14 at the locations of the lower ends of the first and second pipes 24 and 34 of the first and second conduits and the lower drain pipe 54. The housing 12 is then mounted on the base stud 16 with the first and second pipes 24 and 34 and the first drain pipe 54 inserted through the previously drilled holes in the base stud 16. The lower ends of the first and second pipes 24 and 34 and the drain pipe 54 may be connected to the building hot and cold water pipes and the building drain pipe, either immediately or later after a wall panel is mounted over the stud wall 14.

In this position, as shown in FIG. 4, the apparatus 10 is self supporting on the base stud 16. An optional strap, not shown, may extend from the housing 12 to one of the vertical studs 18 to ensure that the housing 12 is held in a stationary position within the stud wall 14 prior to mounting the drywall over the wall studs.

The upper drain pipe 64 may be connected to the building plumbing vent lines by removing the cap 64 and utilizing the suitable fitting, not shown, to connect the upper drain pipe 64 to the building vent line 76 shown in phantom in FIG. 4.

A sheet of drywall may then be installed, with suitable holes at precise locations onto the stud wall 14 with the connector pipes 66 and 68 and the drain connector 72 projecting outwardly through the holes in the sheet of drywall. In this manner, a plumber need not completely finish all of the connections to rough-in a sink fixture prior to the drywaller installing the drywall or other wall sheet to the stud frame wall 14.

After the suitable wall surface has been applied, the plumber then removes the caps 70 and 74, mounts the sink in the appropriate location on the wall and then connects the sink hot and cold water lines to the connector pipes 66 and 68 and the sink drain line to the drain connector pipe 72 utilizing suitable fittings, connectors, etc.

In summary, there has been disclosed a unique prefabricated rough-in sink plumbing apparatus which simplifies the rough-in and final mounting connections of a sink. The apparatus also enables a plumber to preinstall the apparatus within a frame stud wall without completing all of the sink connections and then returning later to hang and make the final sink connections after the drywaller has mounted the drywall over the frame wall. This simplifies the entire building process by enabling a plumber to rough-in the plumbing connections for a building or home and then letting drywall contractor begin his work before the actual finish plumbing connections are completed.

What is claimed is:

1. A prefabricated sink plumbing apparatus for installation in a cavity between two vertical wall studs and connectible to hot and cold water pipes and a drain pipe, the apparatus comprises:

a housing having a front wall and opposed first and second end walls;

first and second water conduits, each with first and second ends, mounted in the housing, with the first and second ends projecting outwardly through the first and second end walls of the housing, respectively;

a drain conduit, with first and second ends, disposed in the housing, with the first and second ends extending through the first and second end walls of the housing, respectively;

first, second and third fittings mounted between the first and second ends of each of the first and second conduits and the drain conduit in fluid flow communication with the first and second conduits and the drain conduit, respectively;

first and second connector pipes connected to the first and second fittings, respectively, the first and second connector pipes extending exteriorly of the front wall of the housing for connection to a sink hot and cold water pipes; and a third connector pipe connected to the drain fitting and extending exteriorly of the front wall of the housing for connection to a sink drain pipe.

2. The apparatus of claim 1 wherein:

the housing is formed of an insulating material.

3. The apparatus of claim 2 wherein the insulating material is a foam material.

4. The apparatus of claim 1 wherein the housing is formed of a foam material encasing the first and second water conduits and the drain conduit.

5. The apparatus of claim 1 further comprising:

means for forming the second ends of the first and second conduits as air cushions.

6. The apparatus of claim 5 wherein the air cushion forming means comprises:

a cap sealingly mounted on the second ends of each of the first and second conduits.

7. The apparatus of claim 1 further comprising:

removable means, mounted on the first and second and third connector pipes projecting to the front wall of the housing for closing the ends of the first, second and third connector pipes.

8. The apparatus of claim 7 wherein the removable means comprise caps.

9. The apparatus of claim 1 further comprising:

means for removably closing the second end of the drain conduit.

* * * * *